(12) United States Patent
Wells

(10) Patent No.: US 9,729,444 B2
(45) Date of Patent: Aug. 8, 2017

(54) HIGH SPEED PACKET PROCESSING USING A DISTRIBUTED HASH TABLE

(71) Applicant: Cisco Systems, Inc., San Jose, CA (US)

(72) Inventor: Ian Wells, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 14/340,901

(22) Filed: Jul. 25, 2014

(65) Prior Publication Data

US 2016/0028630 A1    Jan. 28, 2016

(51) Int. Cl.
*H04L 12/28* (2006.01)
*H04L 12/743* (2013.01)
*H04L 12/741* (2013.01)
*H04L 12/721* (2013.01)

(52) U.S. Cl.
CPC .......... *H04L 45/7453* (2013.01); *H04L 45/54* (2013.01); *H04L 45/38* (2013.01)

(58) Field of Classification Search
CPC .................................................. H04W 52/02
See application file for complete search history.

(56) References Cited

U.S. PATENT DOCUMENTS

| | | | |
|---|---|---|---|
| 7,903,654 B2 | 3/2011 | Bansal et al. | |
| 8,014,278 B1 | 9/2011 | Subramanian et al. | |
| 8,619,584 B2 | 12/2013 | Dhar et al. | |
| 8,977,660 B1* | 3/2015 | Xin | H04N 21/23103 707/747 |
| 2005/0237948 A1* | 10/2005 | Wan | H04L 29/06 370/254 |
| 2010/0061385 A1* | 3/2010 | Welin | H04L 29/12028 370/401 |
| 2012/0207061 A1* | 8/2012 | Smith | H04L 45/02 370/255 |
| 2013/0003549 A1 | 1/2013 | Matthews et al. | |
| 2013/0266014 A1* | 10/2013 | Blomquist | H04L 45/7453 370/392 |
| 2015/0341473 A1* | 11/2015 | Dumitrescu | H04L 69/22 370/392 |

* cited by examiner

*Primary Examiner* — Chi H Pham
*Assistant Examiner* — Fahmida Chowdhury
(74) *Attorney, Agent, or Firm* — Parker Ibrahim & Berg LLC; James M. Behmke; Stephen D. LeBarron

(57) ABSTRACT

In one embodiment, forwarding information with respect to a particular data packet is requested from a distributed hash table (DHT) that stores key-network flow information pairs. A plurality of nodes in a network participate in the DHT, each node locally stores network flow information as dictated by a hashing function of the DHT, and the network flow information can be used to process data packets in the network. Then, forwarding information is received from the DHT indicating a destination node of the plurality of nodes to which the particular data packet should be forwarded according to the hashing function of the DHT. The destination node stores network flow information that corresponds to the particular data packet. Finally, the particular data packet is forwarded toward the destination node in order for the particular data packet to be processed using the network flow information stored at the destination node.

19 Claims, 10 Drawing Sheets

HIGH SPEED PACKET PROCESSING USING A DISTRIBUTED HASH TABLE

TECHNICAL FIELD

The present disclosure relates generally to computer networks, and, more particularly, to packet processing using distributed hash tables (DHTs).

BACKGROUND

High performance cloud-scale networking applications process millions of packets a second. These cloud-scale applications are required for complex and resource-intensive processes, such as spinning up new virtual machines (VMs) and sharing an existing load over those VMs, shutting down VMs and redistributing their load across existing VMs, and dealing with the unexpected shutdown of VMs due to software fault or failure of the machine on which they are running. In view of these challenges, there is a well-established design pattern used with cloud-scale web applications, where a load balancer and some form of distributed datastore are used. This functionality typically operates independently of the cloud-scale web application itself.

However, high performance networking applications face a different challenge with respect to web applications, in that they can implement a so-called "bump-in-the-wire" approach on high-speed network traffic, where, for example, a transparent firewall resides between groups of hosts and has the ability to filter traffic between hosts within the subnet. In such a case, data packets must be continuously processed, and outages as short as 50 ms may be unacceptable. For example, in a network of VMs, when a VM is lost, data will likely need to be re-fetched and sent to the VM that receives the flow of the lost VM as a result of rebalancing. Additionally, should a VM be added to or removed from the network through scaling, data will need to be redistributed in order to rebalance the flows, even though packets cannot be processed until the data has arrived. In either case, a delay is likely to occur as data is recovered on the new machine from the location at which the data backup exists. As such, when redistributing the VM network flows due to one of the above events, it is important that the flows be rebalanced to VMs that already contain a copy of the state of the flow, without having to first replicate all data on all nodes, which can take too long and require too much network traffic to be feasible.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, forwarding information with respect to a particular data packet is requested from a distributed hash table (DHT) that stores key-network flow information pairs. A plurality of nodes in a network participate in the DHT, each node locally stores network flow information as dictated by a hashing function of the DHT, and the network flow information can be used to process data packets in the network. Then, forwarding information is received from the DHT indicating a destination node of the plurality of nodes to which the particular data packet should be forwarded according to the hashing function of the DHT. The destination node stores network flow information that corresponds to the particular data packet. Finally, the particular data packet is forwarded toward the destination node in order for the particular data packet to be processed using the network flow information stored at the destination node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
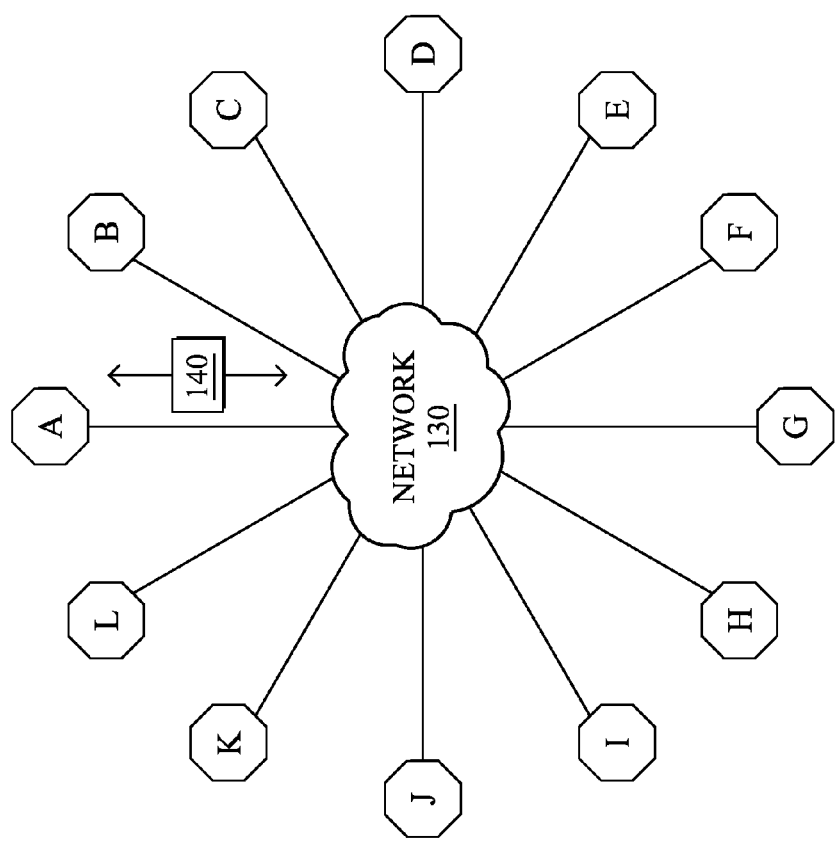
FIG. 1 illustrates an example computer network.

FIG. 1 is a schematic block diagram of an example simplified computer network illustratively comprising nodes/devices 200 (e.g., labeled as shown, "A", "B", "C", etc.) interconnected by various methods of communication, generally referenced as "network 130". For instance, the links may be wired links or shared media (e.g., wireless links) where certain nodes 200, such as, e.g., routers, servers, sensors, computers, etc., may be in communication with other nodes 200, e.g., based on physical location, current operational status, etc. Of course, the computer network 130, through which the various nodes 200 are interconnected, may comprise any feasible configuration of devices, communication links, sub-networks, and the like; however, for simplification purposes, the computer network 130 is simply illustrated throughout the present figures as such.

One or more of the nodes 200 may alternatively be a virtual machine or some other a software-based emulation of a computer. Data packets 140 may be exchanged among the nodes/devices of the computer network using predefined network communication protocols such as certain known wired protocols, wireless protocols, etc., where appropriate.

In this context, a protocol consists of a set of rules defining how the nodes interact with each other. Those skilled in the art will understand that any number of nodes, devices, links, etc. may be used in the computer network, and that the view shown herein is for simplicity.

Figure 2:
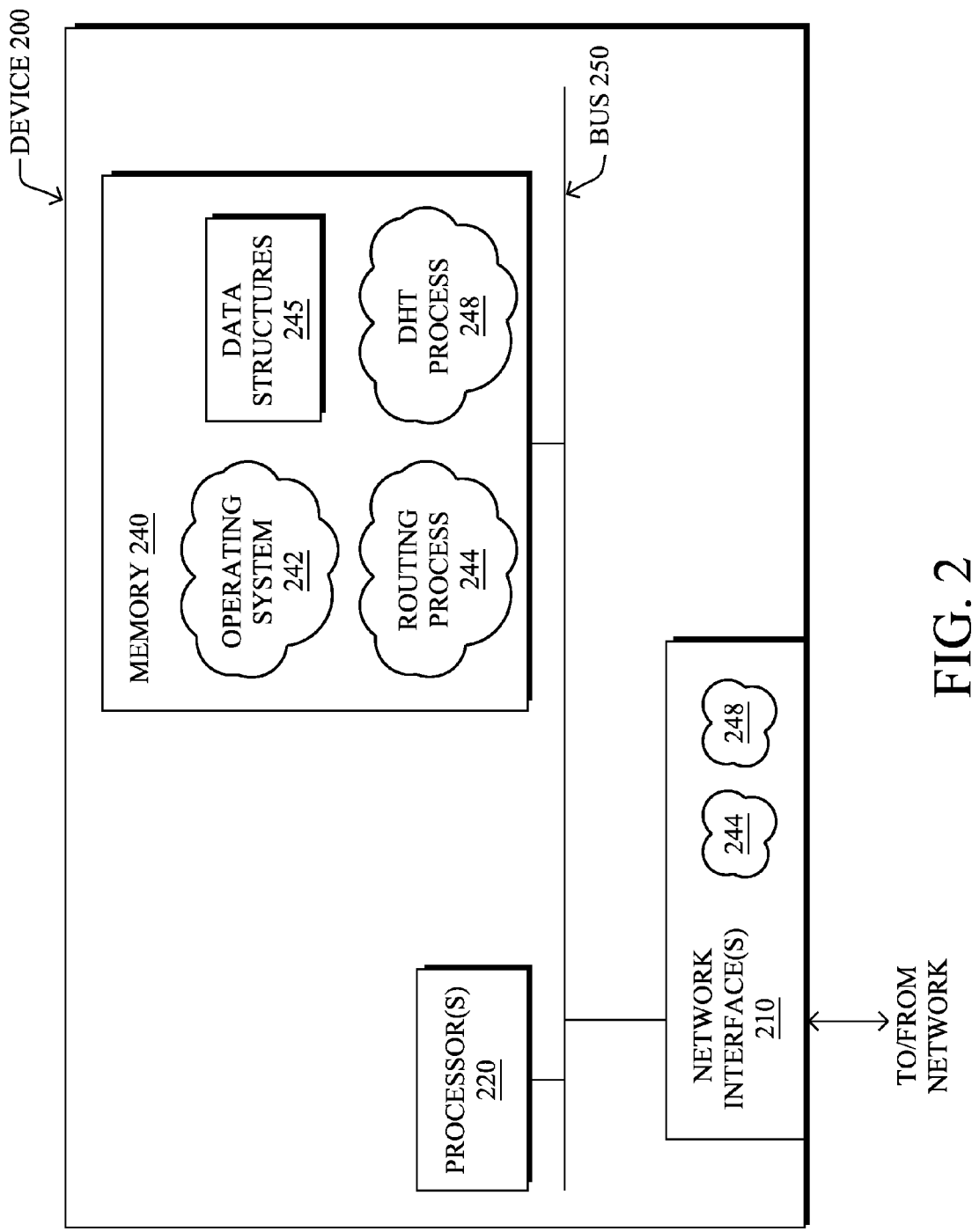
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 130. The network interfaces may be configured to transmit and/or receive data using one or more communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process 244 and an illustrative distributed hash table (DHT) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For instance, DHT process 248 may be a specific component of routing process 244. Still further, while processes 244 and 248 are shown in centralized memory 240, alternative embodiments provide for the processes to be specifically operated within the network interfaces 210.

Routing process 244 comprises computer executable instructions executed by the processor 220 to perform functions provided by one or more routing protocols, such as proactive or reactive routing protocols or packet transformations as will be understood by those skilled in the art. These functions may, on capable devices, be configured to manage one or more routing or forwarding tables (a data structure 245) containing, e.g., data used to make routing/forwarding decisions. Moreover, packet routing/forwarding decisions may be made according to the DHT process 248, or more specifically, according to a DHT running on multiple devices 200, as described in further detail below.

Notably, load balancing large amounts of network traffic, e.g., 10+Gbits of traffic, between multiple servers that process individual packets can be performed by routing protocols, such as equal-cost multi-path (ECMP) forwarding, which can distribute load by flow in hardware and ensure that all packets in a flow consistently go to a single target. However, when a scaling event occurs that changes the number of servers (e.g., a server is removed or added), many of those flows will be sent to different machines than before. Where this happens, the data for the flow (e.g., network flow information) that resided on the original server is now remote, and there is insufficient time to access or distribute that data, due to the high speeds of network traffic and the need to continuously process incoming packets.

Various approaches have been employed for addressing this issue. However, these past approaches have significant drawbacks due to time and resource constraints experienced in high performance networking applications. For example, storing all network flow information in a single remote datastore is generally not feasible, as there is insufficient time to make remote queries when running at full or near-full line-rate. Similarly, distributing the network flow information in advance to all nodes is typically impractical, as the amount of traffic generated by distributing the data is prohibitively large. Also, the network flow information is then replicated once per node, which can be a wasteful use of memory.

Accordingly, rather than storing the network flow information remotely or locally on every machine, distributing and storing the data to a subset of nodes for local storage is preferable. To this end, as described below, a distributed hash table (DHT) can be used to ensure that the state of the flow remains local to the place where the flow was forwarded—even if a node is lost—by storing the state in multiple machines. More particularly, a DHT can be used to store network flow information redundantly in a first- and second-preference location, so that when a certain machine fails, the data necessary for processing the data packets at-issue is instantly available elsewhere. As a result, network failure is reduced by eliminating latency required for re-fetching flow information from a central store. This approach is also scalable and would work with upwards and downwards elastic scaling.

High-Speed Packet Processing Using a Distributed Hash Table

The techniques herein provide a mechanism for ensuring that input received by a distributed application is sent to a device that has the necessary background information (e.g., network flow information) locally at hand to process it, assuming it is not practical to store the information on every device. This should remain true even when the number of devices increases and decreases over time, e.g., due to unexpected hardware failure.

Specifically, according to one or more embodiments of the disclosure as described in detail below, forwarding information with respect to a particular data packet is requested from a distributed hash table (DHT) that stores key-network flow information pairs. A plurality of nodes in a network participate in the DHT, each node locally stores network flow information as dictated by a hashing function of the DHT, and the network flow information can be used to process data packets in the network. Then, forwarding information is received from the DHT indicating a destination node of the plurality of nodes to which the particular data packet should be forwarded according to the hashing function of the DHT. The destination node stores network flow information that corresponds to the particular data packet. Finally, the particular data packet is forwarded toward the destination node in order for the particular data packet to be processed using the network flow information stored at the destination node.

Illustratively, the techniques described herein may be performed by hardware, software, and/or firmware, such as in accordance with the DHT process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various routing and/or packet forwarding protocols, and as such, may be processed by similar components understood in the art that execute those protocols, accordingly.

As referenced above, a distributed hash table (DHT) is a decentralized, expandable, and fault-tolerant database system which is based on key-value pairs. The DHT provides a dictionary-like interface, whereby nodes that store the keys are distributed across the network. The basic DHT protocols work very well for simple applications to store (PUT) and retrieve (GET) objects based on a single key in DHT network. It should be noted that the key of the object is obtained by hashing a unique field in the object, and the root node of the object is strictly based on the result of the hash. That is, to place an object into a node, a key of the object is used to determine a particular node in the network (participating in the DHT "ring") that corresponds to that hashed key. Because in DHTs, a node that stores a particular key is located by hashing that key, the hash table "buckets"—which are employed in a standard hash table—are instead the nodes distributed throughout the network.

Figure 3:
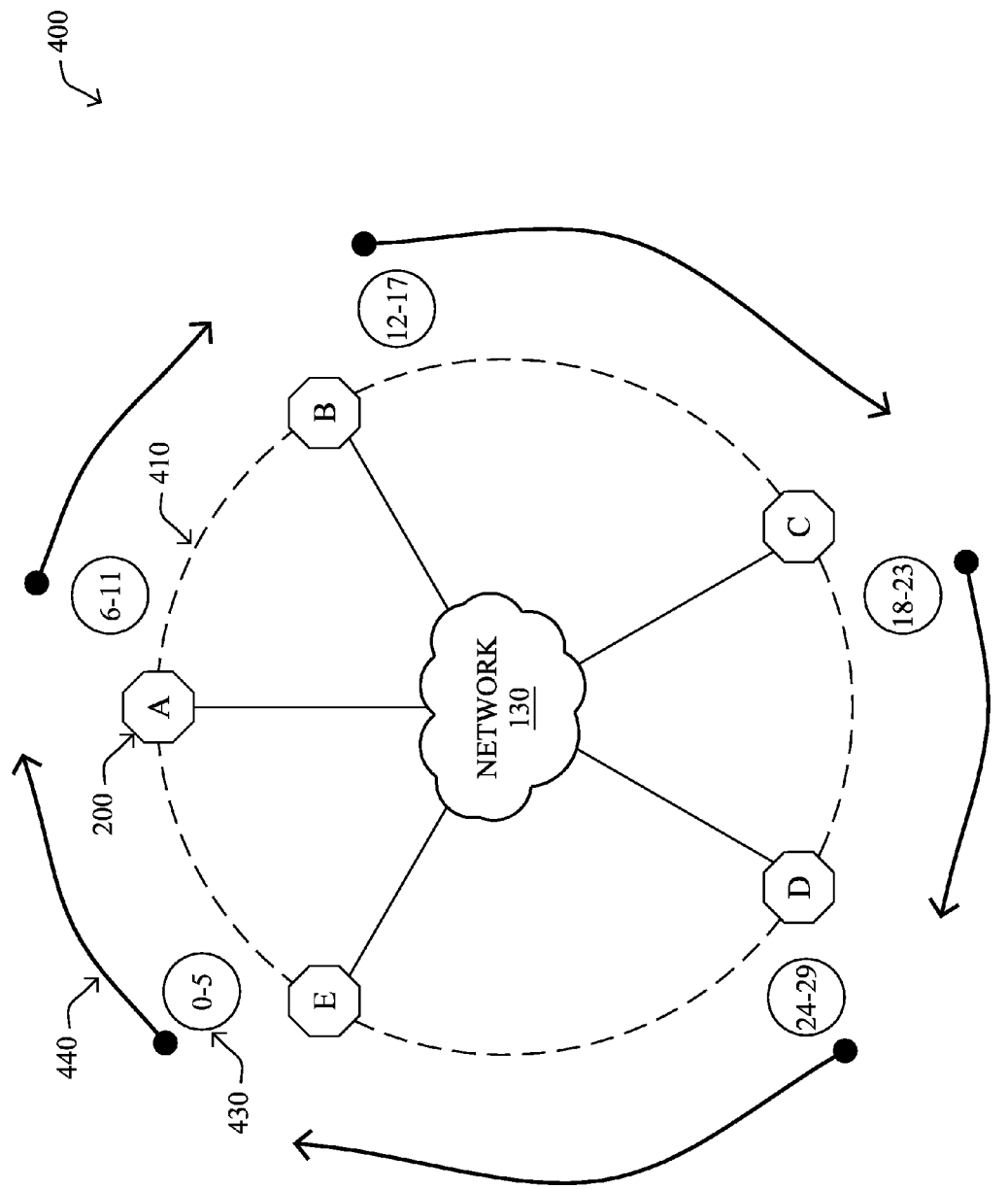
FIG. 3 illustrates a schematic representation of an example DHT implemented in a computer network.
Figure 4:
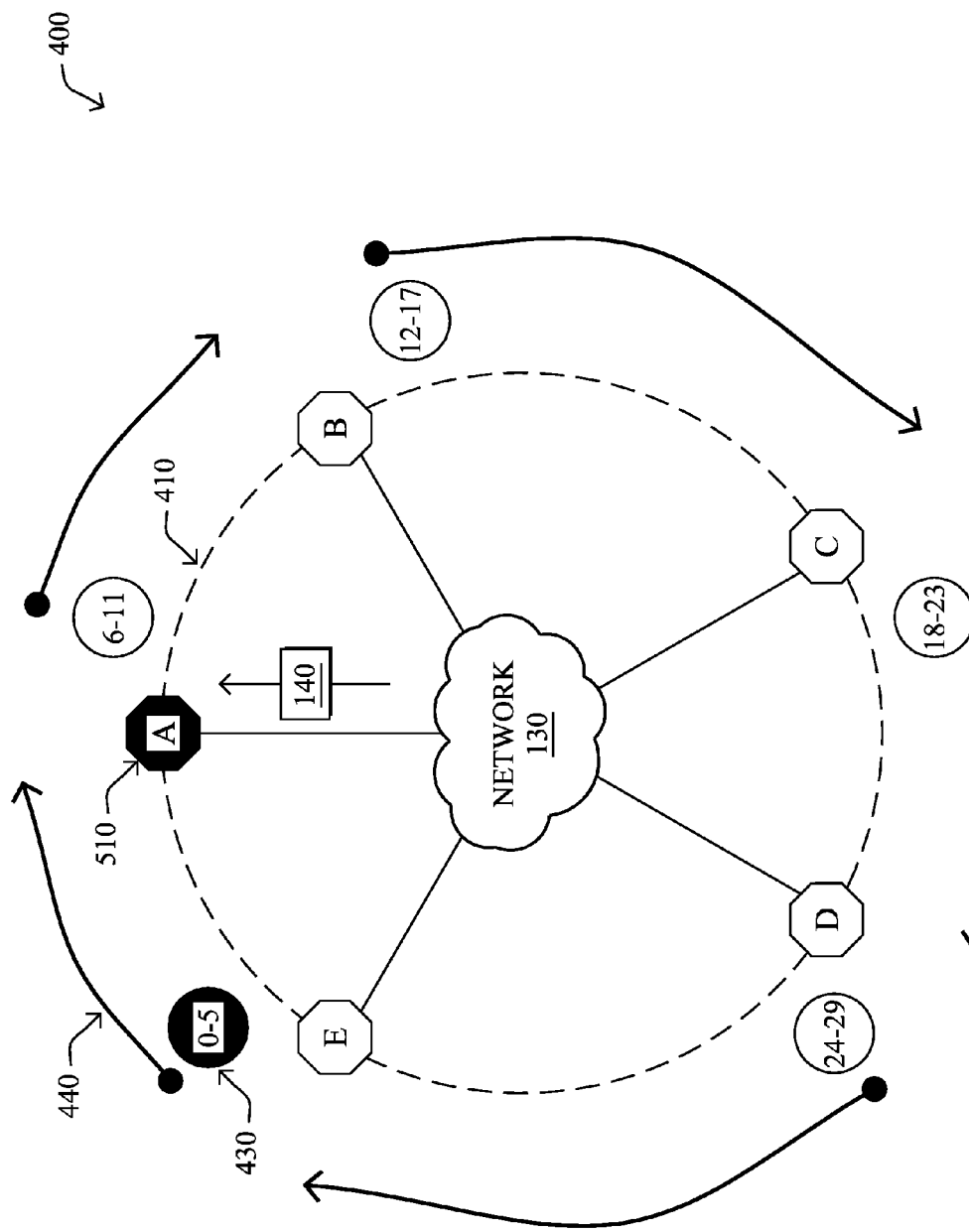
FIG. 4 illustrates a schematic representation of forwarding a data flow according to the example DHT.

FIG. 3 illustrates a schematic representation of an example DHT implemented in a computer network, illustrating how each node has its own keyspace. In particular, to determine a node's keyspace for which the node is a "root node", an identifier (ID) of the node (e.g., a media access control (MAC) address, a node ID, etc.) is hashed to determine a particular "location" within a DHT (e.g., generally a number within a range of 2^128 or 2^256 numbers). As shown in FIG. 4, a DHT 400 comprises multiple nodes 200 (e.g., labeled as shown, "A", "B", "C", etc.) that are interconnected by various methods of communication, generally referenced as "network 130". The nodes 200 participate in a DHT and are located along the DHT ring 410 accordingly. For the purposes of the present embodiments, the DHT may be used to store data that is used to process data packets in the DHT 400 (e.g., network flow information) at the nodes 200 that participate in the DHT.

Any number of nodes 200 may participate in the DHT, and the simplified configuration depicted in FIG. 3 is for illustration purposes only. A node 200 may participate in the DHT by, for example, storing computer code to enable the node to participate in the DHT and have knowledge of other nodes in the DHT. In some scenarios, every node in the DHT 400 that processes data packets may participate in the DHT. This way, data in that DHT node can be accessed directly in memory by the packet processing code. The nodes 200 may include a hardware device, e.g., router, server, computer, etc., or a software-based emulation of a hardware device, e.g., virtual machine.

Each node 200 may locally store network flow information. The nodes 200 may store specific network flow information that can be used to process specific types of data packets, based on any suitable information included in a data packet, such as source port number/IP address, destination port number/IP address, payload information, header information, packet size, packet priority, and so forth. The network flow information stored on each node 200 may be dictated by a hashing function used by the DHT, as described further below. Notably, as explained above, a DHT is designed to store key-value pairs. Therefore, for the purposes of the present embodiments, because the "value" being stored at each node 200 is the network flow information, the DHT may effectively store key-network flow information pairs.

The contents of the network flow information may depend on the application(s) hosted by the nodes 200, such as carrier grade network address translation (NAT) applications, traffic counting, deep packet inspection (DPI), quality of service (QoS) techniques, or any other type of network application where the flow state changes as more packets are received. In these cases, it is often not possible to create or change network flow information and share the updated information with every other node in the system, due to timing and memory constraints. Therefore, it may be more feasible and efficient to share the network flow information with a smaller number of other nodes, as described in further detail below.

The nodes 200 may be positioned along the DHT ring 410 with respect to a keyspace in the DHT, such as a set of 160-bit strings. Any number of keyspace partitioning schemes can be used to distribute ownership of the keyspace among the nodes 200. The communication links between the nodes 200, e.g., network 130, may form an overlay network interconnecting the nodes, thereby determining the network topology. Thus, the network 130 may alternately be referred to as an overlay network. The overlay network may allow the nodes 200 to find the "owner" of any given key in the keyspace, even if the owner is the node itself.

Illustratively (for simplification of explanation), the keyspace in the DHT includes keys 0-29. As a result, the nodes 200 are positioned along the DHT ring 410 such that each node is assigned one or more keys of the keyspace, e.g., keys 0-29. In one example DHT, the keys of the keyspace may be evenly distributed amongst the participating nodes. Thus, in FIG. 3, each node 200 is assigned an equal share of the keyspace. In particular, each node 200 is assigned a key share 430, whereby node "A" is assigned keys 0-5, node "B" is assigned keys 6-11, node "C" is assigned keys 12-17, and so forth.

To place an object (e.g., a file, a data structure, etc.) into the network, the object is hashed (e.g., a unique field in the object) to associate it with a particular key (e.g., "2"), and then the associated PUT request is sent to the node corresponding to that keyspace (e.g., node "A"). To retrieve the object (GET), the requestor submits that same key (e.g., "2"), and the DHT ring 410 is used to determine which device corresponds to that keyspace (again, node "A"). Those skilled in the art will appreciate that there are many ways to organize a keyspace, and the organization shown and described herein is not meant to limit the scope of the embodiments of the disclosure.

As is customary in a typical DHT, a hashing function may be used to map one or more keys of the keyspace to the nodes 200. The hashing function may further be used to redistribute keys amongst the nodes 200 in the event that a node is added or removed to the DHT 400. For the purposes of the present embodiments, a consistent hashing scheme may be utilized by the DHT and is the focus of much of the present disclosure. However, the principles described herein may be applicable to any suitable hashing algorithm that can be utilized in a DHT.

According to the consistent hashing algorithm, session keys may be derived from the dataflow for that session and, via the hashing algorithm, the list of running service machines (e.g., nodes 200) may be used as input in order to generate a preference order of DHT nodes on which the network flow information resides. To this end, the nodes 200 in the DHT 400 and the may be hashed to the DHT ring 410 (e.g., using an ID of the nodes). Of course, the keys of the DHT keyspace may also be hashed to the ring 410. Thus, in order to find the node 200 that stores a value (e.g., network flow information) corresponding to a particular key, the key may first be hashed to its respective location in the DHT ring 410. Then, by traveling from that key location along the ring 410 in a clockwise direction (e.g., labeled as arrows 440), the node 200 that is reached first may be the one storing the value that corresponds to the key. For example, in FIG. 3, the node 200 that locally stores network flow information corresponding to a key value of 3 would be node "A", since node "A" is the nearest node 200 in a clockwise direction from the key value of 3 (i.e., the key value 3 is located in key share "0-5").

The consistent hashing algorithm also controls the manner in which nodes 200 are added or removed to the DHT ring 410, as well as the manner in which the keys are redistributed as a result. To this point, when a DHT node 200 is added or removed, a new preference order of the nodes may be created, which is essentially the same as before with a new node either absent or added in some position without changing the relative order of existing nodes. For instance, when adding a node "E" to the pool "A", "B", "C" and "D", the previous preference order (as established by the hashing function of the DHT) for a given key may have been D-B-C-A. Thus, the new order after adding node "E" could be D-B-E-C-A, such that the relative ordering of the original pool "A", "B", "C" and "D" is preserved. Conversely, if node "C" then dies, the new ordering would be D-B-E-A, such that the relative ordering of the remaining nodes "A", "B", "D" and "E" is again preserved. The concept of adding and removing nodes 200 from the DHT ring 410 is described in further detail below.

FIG. 4 illustrates a schematic representation of forwarding a data flow according to the example DHT. As shown in FIG. 4, a data packet 140 is forwarded using the overlay network 130 to a node 200 according to the DHT. In particular, a data packet 140 may be forwarded, e.g., via the overlay network 130, to a particular node 200 that is capable of processing that data packet. In other words, the particular node 200 locally stores data (e.g., network flow information) that can be used to process the data packet 140. The data packet 140 may be forwarded to a node 200 from another node 200 participating in the DHT, e.g., via the aforementioned communication links present in the network 130, or from any other node in the network 130 over any feasible communication links that may be encompassed by the network 130. Accordingly, the illustration of FIG. 4 is simply for demonstration and simplification purposes only.

According to the consistent hashing algorithm, in order to find a node 200 at which to store a packet (e.g., "PUT"), or a node 200 from which to retrieve a packet (e.g., "GET"), the hashing function may be used to generate a key based on the packet (or information included in the packet). The information included in the packet that can be used by the hashing function may include any suitable information in the packet, such as source port number/IP address, destination port number/IP address, payload information, header information, packet size, packet priority, and so forth. Upon identifying the key corresponding to the packet, the key may be located on the DHT ring 410, and the corresponding node 200 may be determined by traveling from the key along the DHT ring in a clockwise direction until reaching the nearest node. Using the above example, say the hash function generates a key value of "3" by hashing the data packet 140. In this case, the corresponding node (e.g., the node to which the packet 140 should be forwarded for storage, retrieval, processing, etc.) would be node "A", since node "A" is the nearest node 200 in a clockwise direction from the key value of "3", as shown in FIG. 4.

To this end, when determining the node 200 to which a particular data packet 140 should be forwarded for processing, forwarding information may be requested from the DHT. The forwarding information (e.g., information indicating which node 200 stores the network flow information that can be used to process the data packet 140) may be received by using the hashing function of the DHT to hash information relating to the data packet 140, thereby generating a key. Based on the generated key, a node 200 may be identified (e.g., a destination node 510) that stores network flow information corresponding to the data packet 140, in the manner described above. This way, a DHT may be used to determine where a data flow should be forwarded.

Then, the data packet 140 may be forwarded to the destination node 510 (e.g., node "A", as shown in FIG. 4) that stores the corresponding network flow information. As a result, the efficiency in processing the data packet 140 can be greatly increased, as the data packet 140 is forwarded to the destination node 510, where the processing information (e.g., network flow information) is locally stored. In other words, this approach may eliminate lengthy calls to a remote machine that stores the required network flow information, as well as the need to locally store the required network flow information at every node in the network, which is an inefficient and duplicative use of valuable memory.

Optionally, when forwarding the data packet 140 to a node 200, a load balancer may be linked to the hashing function of the DHT, such that the forwarding of the data packet 140 toward the destination node 510 may be performed by the load balancer. As is known in the art, the load balancer is operable to distribute data flows across multiple machines so as to optimize resource utilization, minimize response time, maximize throughput, and so forth. For the purposes of the present embodiments, the load balancer may be linked to the hashing function of the DHT so as to make routing decisions based on the DHT calculations described herein The load balancer may be a hardware device or implemented through software, e.g., in a router. The DHT calculations (e.g., hashing node IDs, data packet information, etc.) may be executed in the control plane and/or the forwarding information base (FIB) of the load balancer, provided that the FIB is kept up-to-date to route the data flows properly. Furthermore, for additional speed, the load balancer could be programmed with an ordered list of preferences and a low-level mechanism, such as bidirectional forwarding detection (BFD), in order to quickly determine failure of a primary node 200 and the necessity to fallback to a secondary "backup" node (the concept of storage redundancy is described further below).

In the alternative, the forwarding of the data packet 140 toward the destination node 510—based on the DHT calculations described herein—may be performed by a forwarding device, such as a router. Further, the DHT-based routing decisions may be used to enhance an existing routing protocol, such as equal-cost multi-path routing (ECMP), for example. That is, the DHT-based routing decisions could act as an extension of ECMP in a router, such that the router can participate in the DHT and thus, make forwarding decisions based on the DHT. For example, if a routing table is large enough, each node may store only part of the table. Then, it may be ensured that data flows are forwarded to the appropriate nodes in the network based on the parts of the routing table stored at the nodes. This approach is particularly helpful should the nodes have insufficient memory for storing the table in its entirety. Therefore, it should be understood that there are multiple ways to implement the DHT-related techniques described herein in a computer network.

Figure 5:
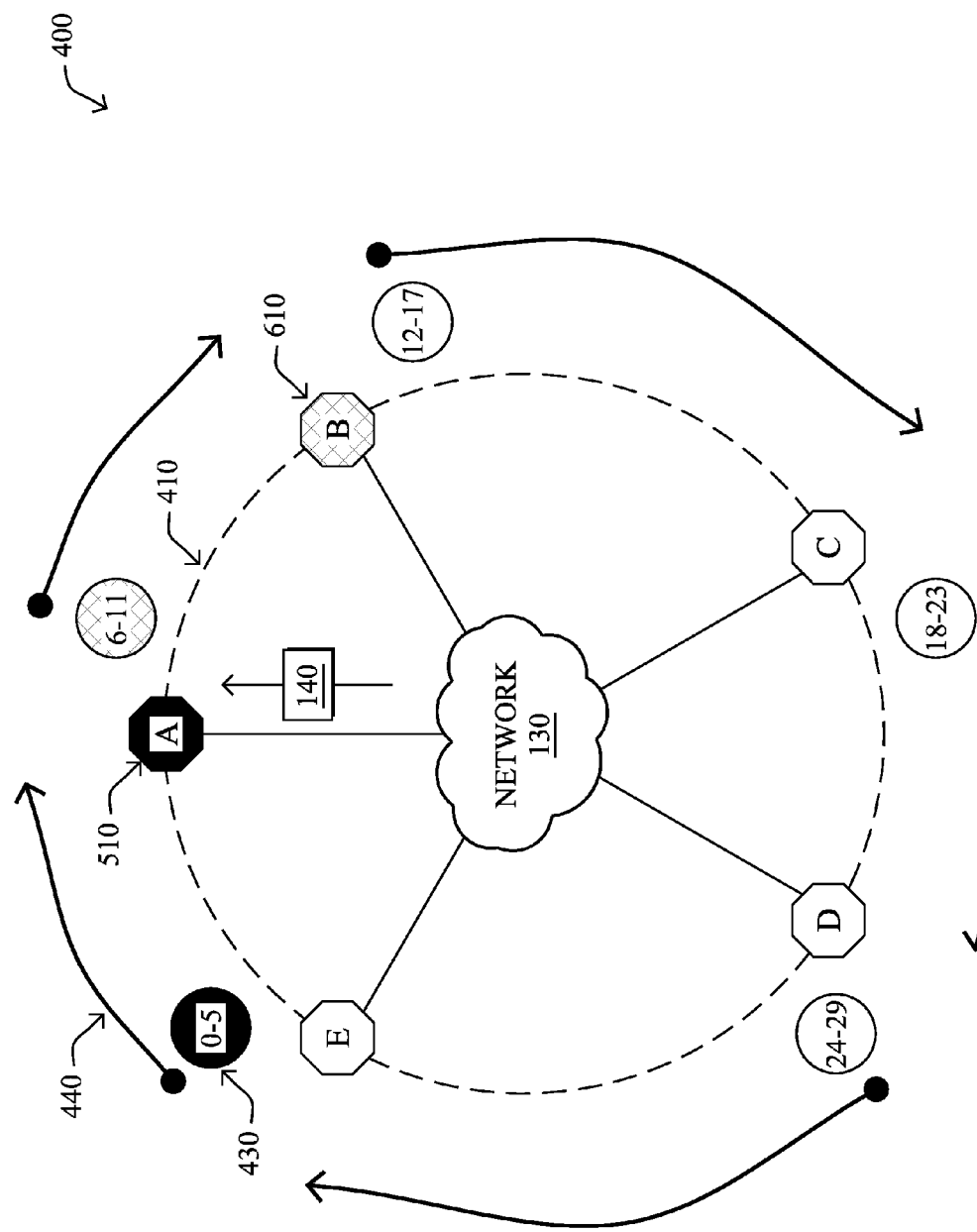
FIG. 5 illustrates a schematic representation of redundantly storing network flow information according to the example DHT.

FIG. 5 illustrates a schematic representation of redundantly storing network flow information according to the example DHT. As shown in FIG. 5, a secondary node 610 may store the network flow information that is also stored at the destination node 510. The secondary node 610 may alternatively be referred to as a "fallback" node.

Storing the network flow information in multiple machines creates storage redundancy throughout the network. Of course, it is typically wasteful and not feasible to store the same network flow information across all nodes in the network, since in a typical network configuration, there can be thousands of interconnected nodes. On the other hand, if the network flow information is stored on only a single node (i.e., no redundancy), should the single node become disconnected from the network, the necessary network flow information may no longer accessible. Thus, maintaining a certain degree of storage redundancy in the DHT is desirable, while avoiding an unnecessarily large storage footprint from storing the same network flow information on every machine in the network.

Illustratively, in FIG. 5, the secondary node 610 is selected for redundant storage of the network flow information according to the hash function of the DHT. Thus, because the network flow information is stored in multiple nodes 200, a preference order for forwarding a data flow is effectively created by the hashing function of the DHT. For instance, with respect to FIG. 5, the hashing function of the DHT dictates that network flow information corresponding to the data packet 140 is primarily stored at the destination node 510 (e.g., node "A") and secondarily stored at the secondary node 610 (e.g., node "B"). Thus, the order of preference for forwarding the data packet 140 would be node "A", then node "B". In other words, as long as node "A" (e.g., destination node 510) is participating in the DHT, the packet 140 may be forwarded to that node. However, should node "A" be removed from the DHT (e.g., in the event that the node migrates to another network, loses connectivity, powers down, malfunctions, etc.), the packet 140 may then be forwarded to node "B" (e.g., secondary node 610).

According to the consistent hashing algorithm, node "B" is selected as the secondary node 610 since node "B" is the first node that is reached when traveling from node "A" in a clockwise direction along the DHT ring 410. Notably, the forwarding preference order determined by the consistent hashing algorithm is not limited only to a primary storage node (e.g., destination node 510) and a secondary storage node (e.g., secondary node 610). Instead, the network flow information may be stored at any amount of nodes 200 in the DHT 400. Thus, the forwarding preference order may include any amount of nodes 200. For instance, in FIG. 5, the first fallback node is node "B", and a second fallback node could be node "C", which is the second node that is reached when traveling from node "A" in a clockwise direction along the DHT ring 410. This would mean that the data packet 140 may be forwarded to node "C" in the event that both nodes "A" and "B" were removed from the DHT 400, since node "C" also stores the network flow information used to process the packet 140.

The number of nodes 200 that store network flow information corresponding to a particular data flow may be established by, for example, pre-programming the forwarding device (e.g., load balancer, router, server, VM, etc.). By increasing the amount of nodes at which a copy of the network flow information is stored, the amount of fallback nodes also increases, thereby further reducing the risk that the network flow information is lost should a node 200 become removed from the DHT 400. Of course, increasing the amount of nodes at which a copy of the network flow information is stored may also come at the cost of consuming additional memory resources.

Notably, a fallback node, such as the secondary node 610, may store a copy of network flow information that is also stored at a primary node, such as the destination node 510, in addition to other network flow information corresponding to a different data flow. That is, a node 200 may store copies of network flow information that correspond to multiple data flow types. As such, a node 200 may be treated as a primary node for a first data flow and treated as a fallback node for other data flows. Also, a node 200 may be involved in multiple forwarding preference orders, as dictated by the hashing function of the DHT.

Figure 6A:
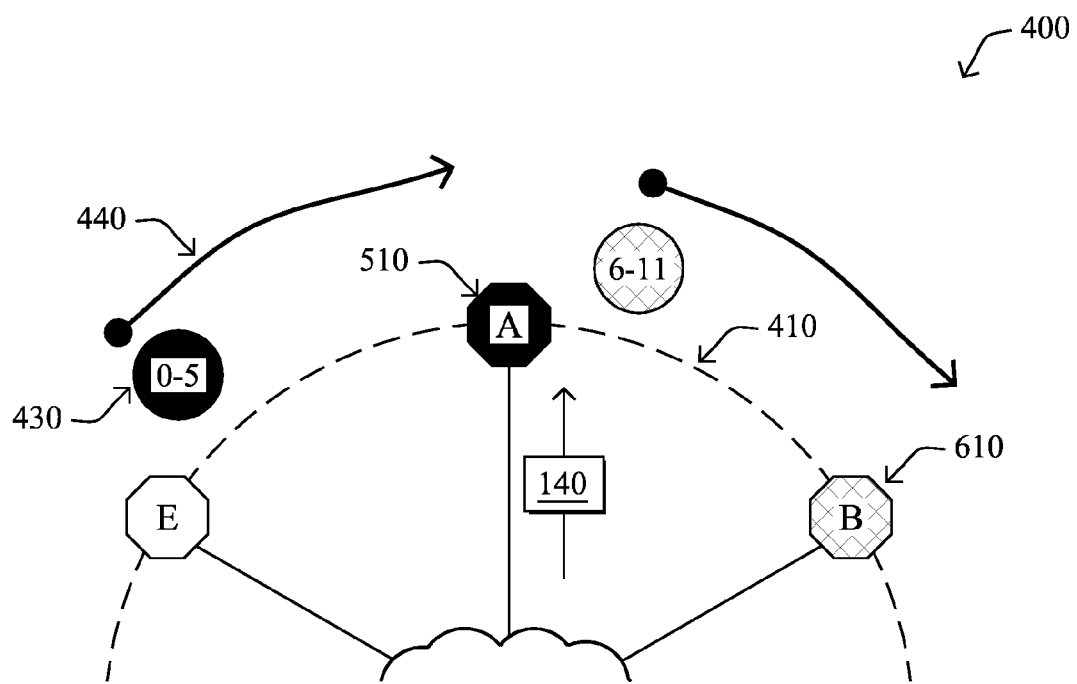
FIGS. 6A and 6B illustrate a schematic representation of a forwarding preference order established according to the example DHT.
Figure 6B:
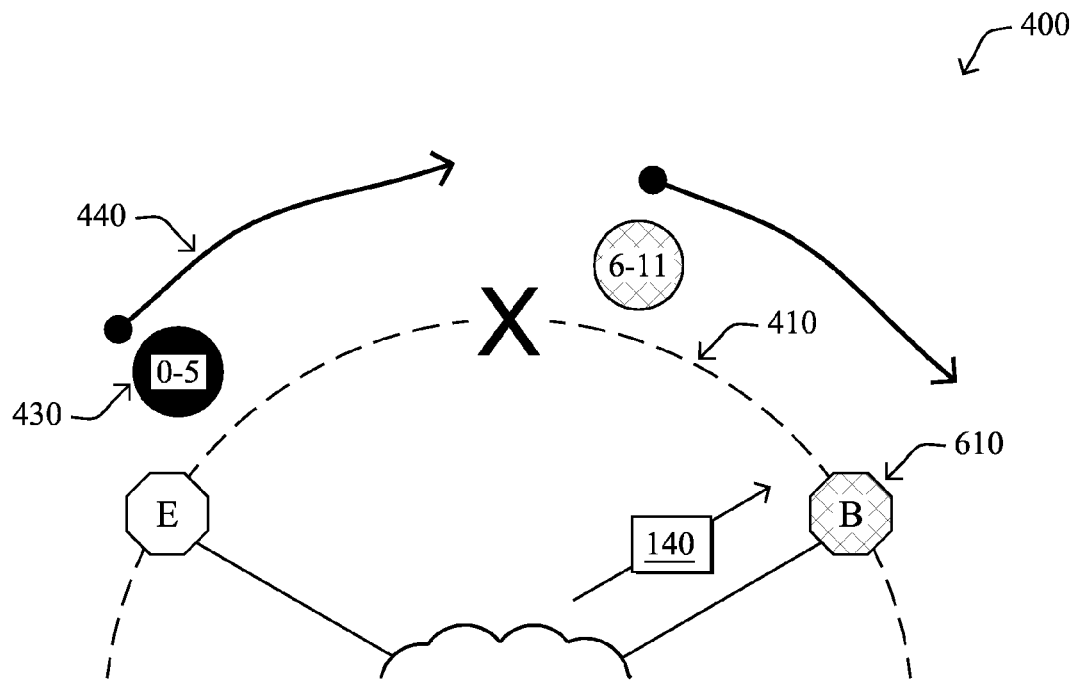

FIGS. 6A and 6B illustrate a schematic representation of a forwarding preference order established according to the example DHT. Illustratively, the forwarding preference order with respect to the data packet 140, as established by a consistent hashing algorithm, is first, the destination node 510 (e.g., node "A"), and second, the secondary node 610 (e.g., node "B"). This is because, as described above, a key value of "3" is generated when hashing information related to the data packet 140, and the key of "3" corresponds to the destination node "A", according to the consistent hashing algorithm. Then, node "B" may be the secondary preference location for forwarding the packet 140, since node "B" is located first on the DHT ring 410 when traveling in a clockwise direction from node "A". Therefore, based on this preference order, as long as the destination node 510 is participating in the DHT, the packet 140 may be forwarded to that node, as shown in FIG. 6A. However, should the destination node 510 be removed from the DHT (e.g., in the event that the node migrates to another network, loses connectivity, powers down, malfunctions, etc.), the packet 140 may then be forwarded to secondary node 610, as shown in FIG. 6B.

Figure 7:
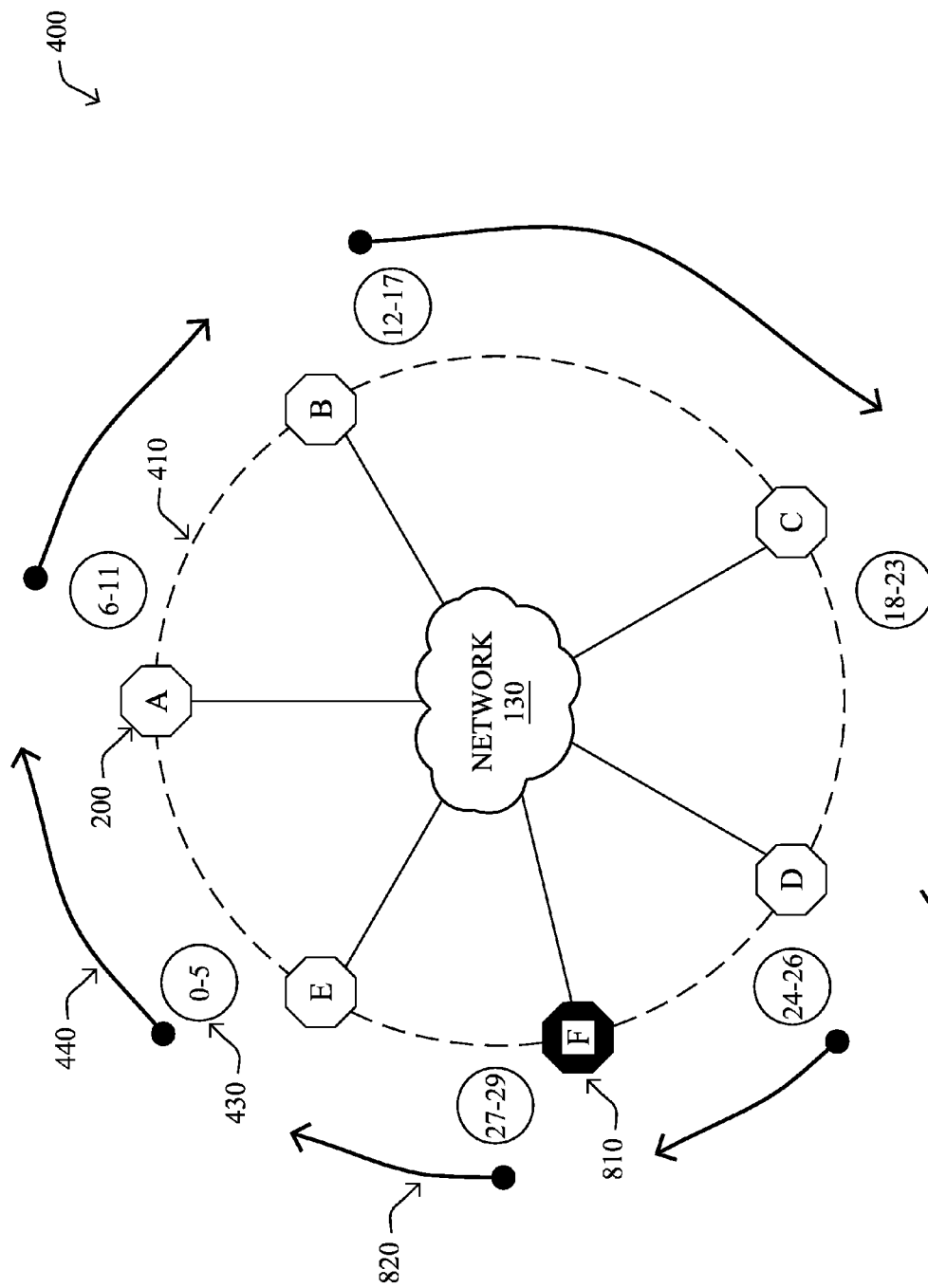
FIGS. 7 and 8 illustrate a schematic representation of adding and removing a node to the DHT, respectively, according to a hashing function of the DHT.
Figure 8:
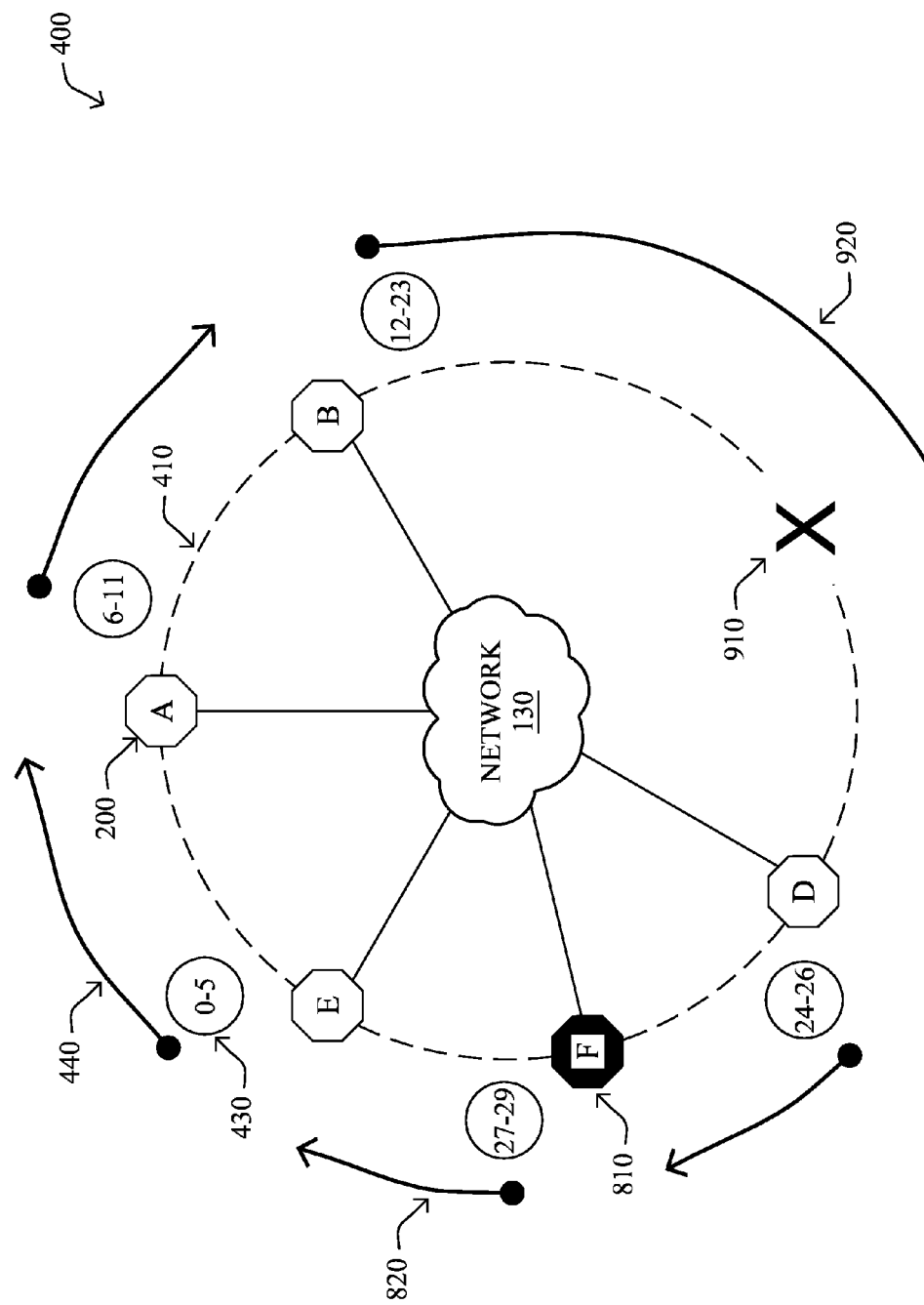

FIGS. 7 and 8 illustrate a schematic representation of adding and removing a node to the DHT, respectively, according to a hashing function of the DHT. In general, when a DHT node 200 is added or removed, a new preference order of the nodes may be created, which is essentially the same as before with a new node either absent or added in some position without changing the relative order of existing nodes. When nodes are added or removed to the DHT, the keys of the DHT keyspace may be redistributed amongst the nodes 200 accordingly. Moreover, when the nodes 200 are changed and the keys are redistributed, the network flow information corresponding to certain data flows may be transferred to the appropriate node(s) in order to ensure that network flow information is always locally stored in memory, even after changes in the pool. This way, the balance of the DHT may be preserved. For the purposes of the present embodiments, the DHT may utilize the consistent hashing algorithm to control the manner in which nodes 200 are added or removed to the DHT ring 410, as well as the manner in which the keys are redistributed as a result.

As shown in FIG. 7, a node 810 (e.g., node "F") has been added to the DHT 400. In particular, the added node 810 may be added to the DHT ring 410 between nodes "D" and "E". The location on the DHT ring 410 at which the added node 810 is inserted may be determined by the hashing function of the DHT. For instance, the ID of the added node 810 may be hashed, and the added node 810 can be mapped to one or more keys of the keyspace accordingly. Importantly, as described above, the relative order of the nodes 200 may remain the same, despite the node 810 being added to the DHT. Thus, in FIG. 7, after the insertion of node "F" to the DHT, the new ordering of the nodes 200 (e.g., A-B-C-D-F-E) preserves the previous relative ordering of the other nodes (e.g., A-B-C-D-E).

Generally, when a node is added to the DHT, the keys of the keyspace may need to be redistributed amongst the nodes 200 (unless there are unmapped keys in the DHT, and the added node 810 can be mapped to those keys). For example, in FIG. 7, keys 24-29 were previously mapped to node "E". Because the added node 810 is inserted on the DHT ring 410 adjacent to node "E" in the counterclockwise direction, the added node 810 is effectively positioned in the keyspace of node "E" (e.g., keys 24-29). Thus, the keyspace of node "E" may be divided between node "E" and newly added node "F". For example, after adding node "F" to the DHT, keys 24-26 may be mapped to node "F", and keys 27-29 may remain mapped to node "E", as shown in FIG. 7 (e.g., labeled as arrow 820). It is noted that the keys of the keyspace may be redistributed amongst the nodes 200 in any suitable manner upon adding a node to the DHT. The redistribution of keys in the keyspace may be determined by the hashing function of the DHT.

The added node 810 may take time to synchronize its data with the DHT pool, such that the added node 810 locally stores the information necessary to run the DHT, as well as the appropriate network flow information. Once synchronized, the forwarding device (e.g., load balancer, router, etc.) may be informed that the added node 810 exists. The other nodes 200 may be informed that the added node 810 exists, as well. Then, the added node 810 may begin receiving data flows in the DHT 400, as it is the first preference location for corresponding data packets. Thus, as the data flows are rebalanced over the nodes 200, they are redirected to nodes where the network flow information used to process those data flows exists locally.

As shown in FIG. 8, a node has been removed from the DHT (e.g., labeled as "X" 910). In particular, the node "C" may be removed from the DHT, and as a result, nodes "B" and "D" may now be located adjacent to one another on the DHT ring 410. A node may be removed from the DHT for a variety of reasons, such as the node migrating to another network, losing connectivity, powering down, malfunctioning, and the like. Importantly, just as in the case of a node being added to the DHT, the relative order of the nodes 200 may remain the same when a node is removed from the DHT. Thus, in FIG. 8, after the removal of node "C" from the DHT, the new ordering of the nodes 200 (e.g., A-B-D-F-E) preserves the previous relative ordering of the other nodes.

Moreover, when a node is removed from the DHT, the keys of the keyspace may need to be redistributed amongst the nodes 200, such that the keys previously mapped to the removed node are re-mapped to other nodes in the DHT. For example, in FIG. 8, keys 12-17 were previously mapped to node "C". However, because node "C" is removed from the DHT 400, those keys are no longer mapped to a node 200. Thus, keys 12-17 may be redistributed to other nodes 200 in a variety of ways. For example, because node "D" is the first node reached from keys 12-17 when traveling counterclockwise along the DHT ring 410, those keys may be mapped to node "D", along with keys 18-23 (e.g., labeled as arrow 920). Alternatively, nodes "B" and "D", which surrounded node "C", may both be mapped to a share of keys 12-17. It is noted that the keys of the keyspace may be redistributed amongst the nodes 200 in any suitable manner upon removing a node from the DHT. The redistribution of keys in the keyspace may be determined by the hashing function of the DHT. Note that however keys are redistributed, they may be done in such a way that the new node assigned to the space has the corresponding key-data pair before any given key is reassigned.

When a node is removed from the DHT, the forwarding device (e.g., load balancer, router, server, etc.) may be informed that the node is removed. The other nodes 200 may be informed that the node is removed, as well. Also, the DHT may be resynchronized by recalculating the preferences of keys. In particular, the forwarding device will re-route data from the dead machine to the second preference machine, according to the hashing function. Since the second preference machine from the load balancer's perspective is also the second preference in the DHT, as the load balancer is synced with the DHT, the second preference machine (e.g., secondary node 610) locally stores a backup copy of the network flow information. Therefore, without moving any data around from node to node, all traffic can still be directed to a machine that contains the data locally. Data may be moved as part of the resynchronization process, but it is not necessary to wait for this movement in order to continue processing the data packets, since the corresponding network flow information may be locally stored at a fallback DHT node. Therefore, no remote fetching of data is required, and processing delays can be greatly reduced as a result.

Figure 9:
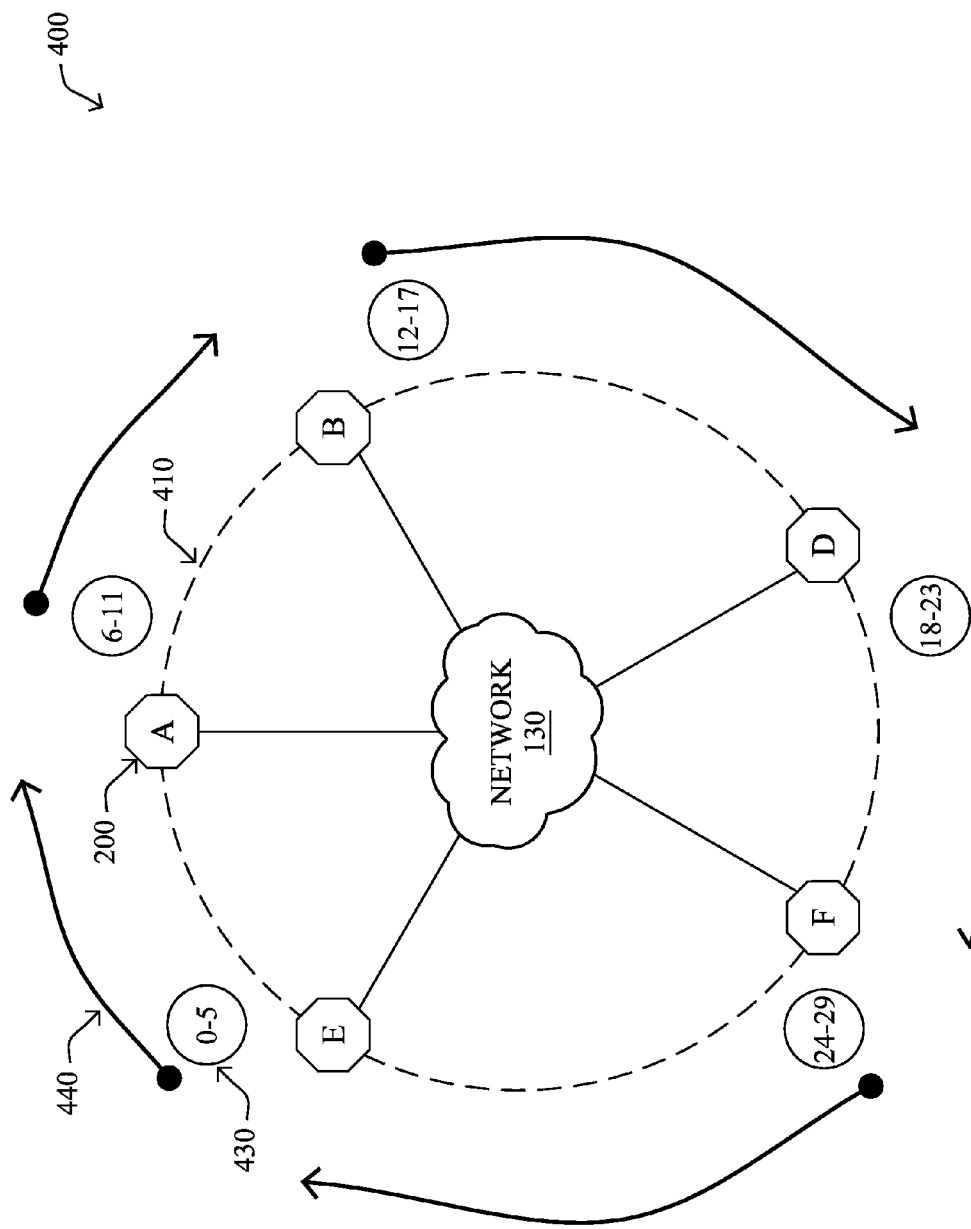
FIG. 9 illustrates a schematic representation of resynchronization of the DHT.

Furthermore, as illustrated in FIG. 9, the DHT may be periodically resynchronized, in order to redistribute one or more keys of the keyspace amongst the nodes 200, such that the key mappings are evenly distributed. In effect, the nodes 200 may be functionally, if not literally, relocated on the DHT ring 410. For example, as shown in FIG. 9, the keys of the keyspace are remapped to the nodes 200, so as to correct unbalanced key mappings resulting from the addition and/or removal of nodes from the DHT 400 (e.g., as shown in FIGS. 7 and 8). Thus, after resynchronizing the DHT, the nodes "A", "B", "D", "F", and "E" may be each mapped to an equal portion of the keyspace. The resynchronization of the DHT may occur according to any suitable schedule, such as a predetermined, recurring schedule, upon an addition and/or removal of a DHT node, upon an addition and/or removal of a threshold amount of DHT nodes, upon recognizing that a threshold percentage of the keyspace is mapped to a single DHT node, and so forth.

Figure 10:
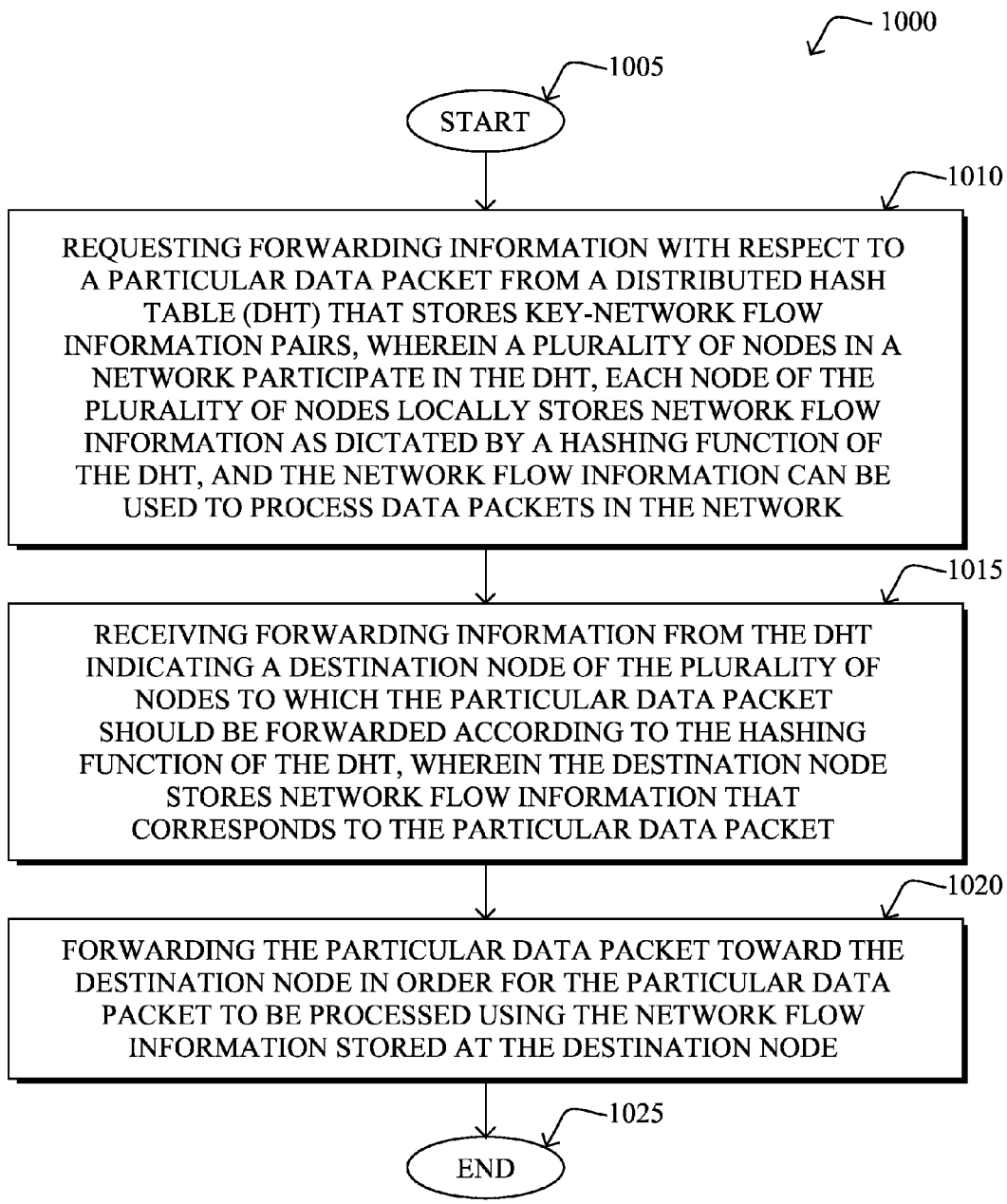
FIG. 10 illustrates an example simplified procedure for high-speed packet processing using a DHT.

FIG. 10 illustrates an example simplified procedure for high-speed packet processing using a DHT. The procedure 1000 may start at step 1005, and continues to step 1010, where, as described in greater detail above, a DHT stores key-network flow information pairs at a plurality of nodes in a network, and the DHT is used for making forwarding decisions in order to process data flows in the network.

At step 1010, forwarding information with respect to a particular data packet is requested from a DHT that stores key-network flow information pairs. As described above, a plurality of nodes in a network participate in the DHT, each node locally stores network flow information as dictated by a hashing function of the DHT, and the network flow information can be used to process data packets in the network. Any number of nodes may participate in the DHT. A node may participate in the DHT by, for example, storing computer code to enable the node to participate in the DHT and have knowledge of other nodes in the DHT. In some scenarios, every node in the network that processes data packets may participate in the DHT. This way, data in that DHT node can be accessed directly in memory by the packet processing code. The DHT nodes may include a hardware device, e.g., router, server, computer, etc., or a software-based emulation of a hardware device, e.g., virtual machine.

Then, at step 1015, forwarding information is received from the DHT (i.e., it is synchronized with the DHT's keyspace) indicating a destination node of the plurality of nodes to which the particular data packet should be forwarded according to the hashing function of the DHT. The destination node stores network flow information that corresponds to the particular data packet. The destination node may store specific network flow information that can be used to process the particular data packet, based on any suitable information included in the data packet, such as source port number/IP address, destination port number/IP address, payload information, header information, packet size, packet priority, and so forth. The network flow information stored on the destination node, as well as the other DHT nodes in the network, may be dictated by a hashing function used by the DHT.

Finally, at step 1020, the particular data packet is forwarded toward the destination node in order for the particular data packet to be processed using the network flow information stored at the destination node. As a result, the efficiency in processing the particular data packet can be greatly increased, as the data packet is forwarded to the destination node, where the processing information (e.g., network flow information) is locally stored. In other words, this approach may eliminate lengthy calls to a remote machine that stores the required network flow information, as well as the need to locally store the required network flow information at every node in the network, which is an inefficient and duplicative use of valuable memory (and which adds synchronization costs associated with distributing data to many nodes rather than simply one or two).

The procedure 1000 illustratively ends at step 1025. The techniques by which the steps of procedure 1000 may be performed, as well as ancillary procedures and parameters, are described in detail above.

It should be noted that the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for eliminating time-consuming calls to a remote machine that stores the required network flow information, as well as the need to locally store the required network flow information at every node in the network, which is a waste of valuable memory. The techniques herein are advantageous over other solutions that rely on distributed stores where a number of cross-machine data transfers are required in the packet-critical path to get remote data to the local machine. Many solutions generally assume an active-backup paired setup and do not scale efficiently in the face of higher loads.

While there have been shown and described illustrative embodiments that provide for high-speed packet processing using a DHT in a computer network, it is to be understood that various other adaptations and modifications may be made within the spirit and scope of the embodiments herein. For example, the embodiments have been shown and described herein with relation to a DHT being linked with load balancers. However, the embodiments in their broader sense are not as limited, and may, in fact, be used with other types of forwarding devices, such as a router, for example, whereby the techniques described herein can enhance the routing protocol that is utilized by the router. In addition, while certain hashing algorithms are shown, such as consistent hashing, other suitable hashing algorithms may be used with the DHT, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
receiving a particular data packet at a node of a plurality of nodes participating in a distributed hash table (DHT) that stores key-network flow information pairs, each node of the plurality of nodes locally storing network flow information as dictated by a hashing function of the DHT, the network flow information used to process data packets in the network;
requesting, by the node, forwarding information with respect to the particular data packet from the DHT;
using, by the hashing function, information in a header of a particular data packet to generate a key;
based on the generated key, identifying, by the hashing function, a destination node of the plurality of nodes, the destination node storing necessary network flow information to process the particular data packet;
receiving forwarding information from the DHT indicating the destination node to which the particular data packet should be forwarded according to the hashing function of the DHT; and
forwarding, by the node, the particular data packet toward the destination node in order for the particular data packet to be processed using the network flow information stored at the destination node,
wherein when a new node is added to the plurality of nodes that participate in the DHT, the new node is mapped to at least one key of a keyspace according to the hashing function of the DHT, such that a key mapping order of the other nodes of the plurality of nodes is preserved.

2. The method as in claim 1, further comprising:
   determining at least one secondary node of the plurality of nodes at which to redundantly store the network flow information that is also stored at the destination node according to the hashing function of the DHT.
3. The method as in claim 2, further comprising:
   forwarding the particular data packet toward the destination node while the destination node participates in the DHT; and
   forwarding the particular data packet toward the secondary node when the destination node is removed from the DHT.
4. The method as in claim 2, wherein the secondary node redundantly stores the network flow information that is also stored at the destination node and stores additional network flow information as dictated by the hashing function of the DHT.
5. The method as in claim 1, wherein when a node of the plurality of nodes is removed from the DHT, at least one key of a keyspace that was previously mapped to the node is re-mapped to other nodes of the plurality of nodes according to the hashing function of the DHT, such that a key mapping order of the other nodes of plurality of nodes is preserved.
6. The method as in claim 1, wherein a load balancer is linked to the hashing function of the DHT, such that the forwarding of the particular data packet toward the destination node is performed by the load balancer.
7. The method as in claim 1, wherein a router is linked to the hashing function of the DHT, such that the forwarding of the particular data packet toward the destination node is performed by the router.
8. The method as in claim 1, wherein each node in the network that is capable of processing data packets participates in the DHT.
9. The method as in claim 1, wherein the hashing function of the DHT is based on consistent hashing.
10. An apparatus, comprising:
    one or more network interfaces to communicate with a network, wherein the network interface communicates with a plurality of nodes participating in a distributed hash table (DHT) that stores key-network flow information pairs, each node of the plurality of nodes locally storing network flow information as dictated by a hashing function of the DHT, the network flow information used to process data packets in the network;
    a processor coupled to the one or more network interfaces and adapted to execute a process; and
    a memory configured to store program instructions which contain the process executable by the processor, the process comprising:
      receiving a particular data packet at the network interface;
      requesting forwarding information with respect to the particular data packet from the DHT;
      using, by the hashing function, information in a header of the particular data packet to generate a key;
      based on the generated key, identifying, by the hashing function, a destination node of the plurality of nodes, the destination node storing necessary network flow information to process the particular data packet;
      receiving forwarding information from the DHT indicating the destination node to which the particular data packet should be forwarded according to the hashing function of the DHT; and
      forwarding the particular data packet toward the destination node in order for the particular data packet to be processed using the network flow information stored at the destination node,
    wherein when a new node is added to the plurality of nodes that participate in the DHT, the new node is mapped to at least one key of a keyspace according to the hashing function of the DHT, such that a key mapping order of the other nodes of the plurality of nodes is preserved.
11. The apparatus as in claim 10, wherein the process further comprises:
    determining at least one secondary node of the plurality of nodes at which to redundantly store the network flow information that is also stored at the destination node according to the hashing function of the DHT.
12. The apparatus as in claim 11, wherein the process further comprises:
    forwarding the particular data packet toward the destination node while the destination node participates in the DHT; and
    forwarding the particular data packet toward the secondary node when the destination node is removed from the DHT.
13. The apparatus as in claim 11, wherein the secondary node redundantly stores the network flow information that is also stored at the destination node and stores additional network flow information as dictated by the hashing function of the DHT.
14. The apparatus as in claim 10, wherein when a node of the plurality of nodes is removed from the DHT, at least one key of a keyspace that was previously mapped to the node is re-mapped to other nodes of the plurality of nodes according to the hashing function of the DHT, such that a key mapping order of the other nodes of plurality of nodes is preserved.
15. The apparatus as in claim 10, wherein a load balancer is linked to the hashing function of the DHT, such that the forwarding of the particular data packet toward the destination node is performed by the load balancer.
16. The apparatus as in claim 10, wherein a router is linked to the hashing function of the DHT, such that the forwarding of the particular data packet toward the destination node is performed by the router.
17. The apparatus as in claim 10, wherein each node in the network that is capable of processing data packets participates in the DHT.
18. The apparatus as in claim 10, wherein the hashing function of the DHT is based on consistent hashing.
19. A tangible non-transitory computer readable medium storing program instructions that cause a computer to execute a process, the process comprising:
    receiving a particular packet at a node in of a plurality of nodes participating in a distributed hash table (DHT) that stores key-network flow information pairs, each node of the plurality of nodes locally storing network flow information as dictated by a hashing function of the DHT, the network flow information used to process data packets in the network;
    requesting forwarding information with respect to the particular data packet from the DHT;
    using, by the hashing function, information in a header of the given data packet to generate a key;
    based on the generated key, identifying, by the hashing function, a destination node of the plurality of nodes, the destination node storing necessary network flow information to process the particular data packet;

receiving forwarding information from the DHT indicating the destination node to which the particular data packet should be forwarded according to the hashing function of the DHT; and forwarding the particular data packet toward the destination node in order for the particular data packet to be processed using the network flow information stored at the destination node, wherein when a new node is added to the plurality of nodes that participate in the DHT, the new node is mapped to at least one key of a keyspace according to the hashing function of the DHT, such that a key mapping order of the other nodes of the plurality of nodes is preserved.

* * * * *